United States Patent [19]

Murakami et al.

[11] 4,188,639
[45] Feb. 12, 1980

[54] VIDEO SYNCHRONOUS DETECTOR APPARATUS

[75] Inventors: Toshio Murakami, Yokohama; Masaru Noda, Fujisawa; Hiroaki Nabeyama, Kamakura; Takeshi Murakami, Yokohama, all of Japan

[73] Assignee: Hitachi, Ltd., Japan

[21] Appl. No.: 862,622

[22] Filed: Dec. 20, 1977

[30] Foreign Application Priority Data

Jan. 7, 1977 [JP] Japan ................................ 52-347

[51] Int. Cl.² ............................................. H04N 9/50
[52] U.S. Cl. .................................................... 358/25
[58] Field of Search ...................... 358/23, 24, 25, 36, 358/188, 196; 325/444; 329/50

[56] References Cited

U.S. PATENT DOCUMENTS

| 3,613,032 | 10/1971 | Pond | 333/72 |
| 3,697,685 | 10/1972 | Lunn | 358/188 |

OTHER PUBLICATIONS

Lunn, "A Monolithic Wideband Synchronous Video Detector for Color TV", IEEE Trans. BTR, Jul. 1969, vol. BTR-15 #2, pp. 159-166.

*Primary Examiner*—John C. Martin
*Attorney, Agent, or Firm*—Craig and Antonelli

[57] ABSTRACT

A video synchronous detector apparatus for discriminating a video intermediate frequency signal, in which the video intermediate frequency signal is divided into two parts, one of which is applied to one terminal of a multiplier circuit, and the other of which is applied to the other terminal of the multiplier circuit through a picture-carrier intermediate frequency extraction circuit having a frequency selection circuit and a limiter circuit. The frequency selection circuit is provided with a trap circuit. The trap circuit has a center resonance frequency equal to a differential frequency between a picture-carrier intermediate frequency ($f_p$) and a differential frequency between a color subcarrier intermediate frequency ($f_c$) and a sound-carrier intermediate frequency ($f_s$) so that a so-called sound-cross-color disturbance caused by a beat between the intermediate frequency sound signal and the intermediate frequency picture signal may be reduced.

5 Claims, 9 Drawing Figures

VIDEO SYNCHRONOUS DETECTOR APPARATUS

BACKGROUND OF THE INVENTION

The present invention relates to a video detector apparatus and more particularly to a video synchronous detector apparatus having a picture-carrier intermediate frequency extraction circuit capable of reducing a so-called sound-cross-color disturbance.

It is known in the art to carry out a video synchronous detection by means of multiplying a picture-carrier intermediate frequency extracted from a video intermediate frequency signal (hereinafter referred to as VIF signal) through a picture-carrier intermediate frequency extraction circuit by the original VIF signal which is not routed to the picture-carrier intermediate frequency extraction circuit. In a prior art synchronous detection of the type described above, however, a side band component which is an amplitude-modulated component by the video signal remains not fully attenuated in the signal to be applied to the multiplier circuit. Particularly, when a brightness changes steeply from a black level to a white level, a colored flicker disturbance appears in their boundary portion.

SUMMARY OF THE INVENTION

It is an object of the present invention to provide a video synchronous detector apparatus which, in order to overcome the drawback of the prior art apparatus, has a picture-carrier intermediate frequency extraction circuit for reducing the beat disturbance, that is, a so-called sound-cross-color disturbance.

A feature of the present invention resides in the insertion of a trap circuit in the picture-carrier intermediate frequency extraction circuit of the video synchronous detector apparatus, which trap circuit has a center resonance frequency equal to $f_p-(f_c-f_s)$, where $f_p$ is a picture-carrier intermediate frequency, $f_s$ is a sound-carrier intermediate frequency, and $f_c$ is a color subcarrier intermediate frequency.

DETAILED DESCRIPTION OF THE PREFERRED EMBODIMENTS

For the purpose of better understanding of the present invention, a basic configuration of a prior art synchronous detector apparatus as well as its operation and effect thereof will be first explained with reference to FIG. 1.

Figure 1:
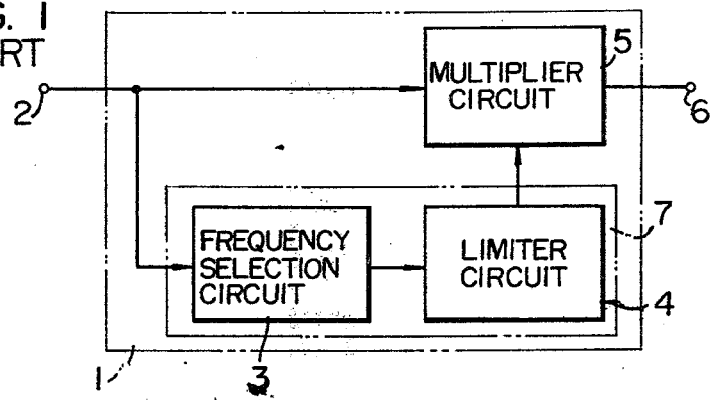
FIG. 1 is a block diagram showing a basic configuration of a prior art synchronous detector apparatus.
Figure 2:
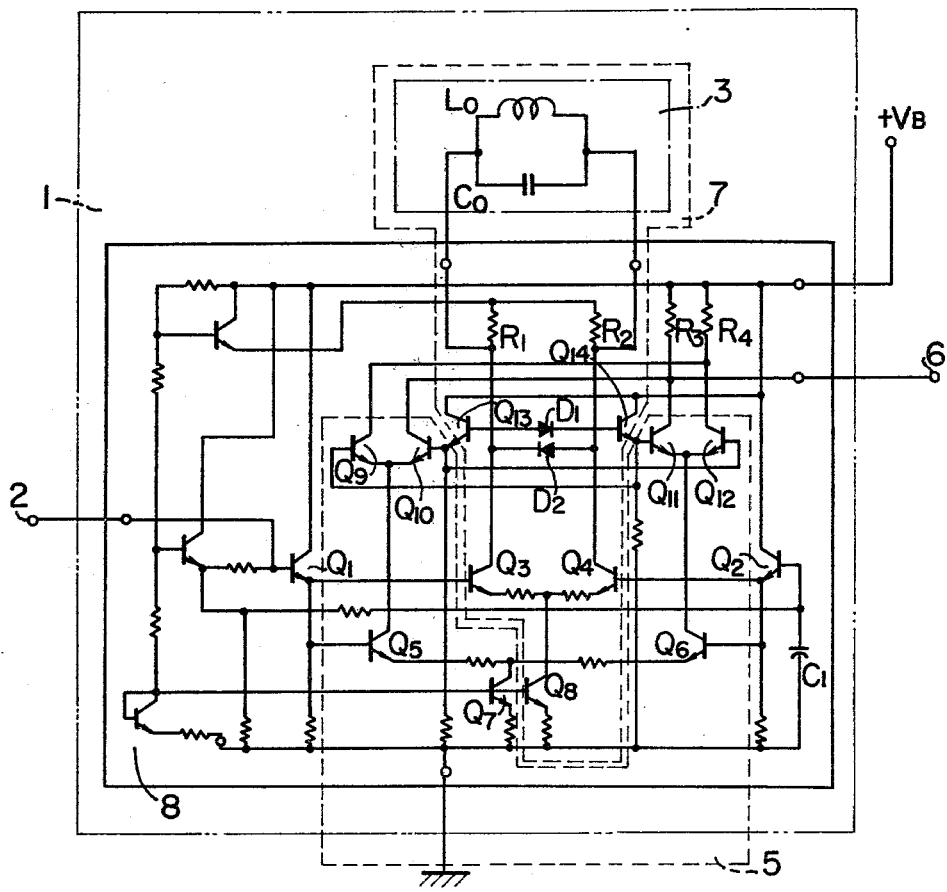
FIG. 2 shows an embodiment of FIG. 1 which is implemented in an integrated circuit.

In FIG. 1, numeral 1 denotes an entire video synchronous detector apparatus in which a video intermediate frequency signal applied to a terminal 2 is divided into two parts, one of which is applied to one terminal of a multiplier circuit 5 while the other of which is applied to the other terminal of the multiplier circuit 5 through a picture-carrier intermediate frequency extraction circuit 7 including a frequency selection circuit 3 and a limiter circuit 4. The frequency selection circuit 3 is tuned to a picture-carrier intermediate frequency of the video intermediate frequency signal:

The NTSC System (U.S.):
$f_p=45.75$ MHz, $f_c=42.17$ MHz and $f_s=41.25$ MHz
The NTSC System (Japan):
$f_p=58.75$ MHz, $f_c=55.18$ MHz and $f_s=54.25$ MHz
The PAL System (West Germany):
$f_p=38.90$ MHz, $f_c=34.47$ MHz and $f_s=33.40$ MHz The multiplier circuit 5 functions to produce a detected output signal at a terminal 6. FIG. 2 shows an arrangement commonly adapted in implementing the configuration of FIG. 1. The multiplier circuit 5 and the limiter circuit 4 are constructed in an integrated circuit structure. In the integrated circuit 8 of FIG. 2, the video intermediate frequency signal applied to the terminal 2 is amplified by transistors $Q_1$ and $Q_2$ and an amplified signal is shaped into a constant amplitude waveform by the limiter circuit 4 comprising transistors $Q_3$, $Q_4$, $Q_8$, $Q_{13}$ and $Q_{14}$ and diodes $D_1$ and $D_2$, and at the same time the picture-carrier intermediate frequency is extracted by the frequency selection circuit 3 comprising a parallel resonance circuit of $L_o$ and $C_o$ which is tuned to the picture-carrier intermediate frequency. The limiter circuit 4 and the frequency selection circuit 3 constitute the picture-carrier intermediate frequency extraction circuit 7. The video intermediate frequency signal applied to the terminal 2 is also applied to the multiplier circuit 5 comprising transistors $Q_5$, $Q_6$, $Q_7$, $Q_9$, $Q_{10}$, $Q_{11}$ and $Q_{12}$ and load resistors $R_3$ and $R_4$, and is subjected to the synchronous detection in the multiplier circuit 5 with the picture-carrier intermediate frequency applied through the transistors $Q_{13}$ and $Q_{14}$ to produce an output at the terminal 6. In this embodiment, the frequency selection circuit 3 comprising the capacitor $C_o$ and the inductor $L_o$ is an off-chip circuit. The higher the Q of the frequency selection circuit 3 is, the purer the picture-carrier component that can be extracted and the closer to the ideal is the synchronous detection attained. However, Q is the selective tuning circuit comprising the lumped constant components $L_o$ and $C_o$, and is, in general, definite (approximately 120 to 150, at most). Accordingly, the signal applied to the multiplier circuit 5 through the conventional picture-carrier intermediate frequency extraction circuit 7 includes a side band wave component which is an amplitude modulated component by the video signal, which component remains not fully attenuated. Thus, if the sound-carrier intermediate frequency included in the input video intermediate frequency signal applied to the terminal 2 is not fully attenuated and the side band wave component has a relatively large energy at a frequency component near the frequency equal to the picture-carrier intermediate frequency $(f_p)-(920\pm500)$ kHz (e.g. when the brightness steeply changes from a black level to a white level), a beat ($3.58\pm0.5$ MHz) between the sound-carrier intermediate frequency ($f_s$) directly applied to the multiplier circuit 5 and the side band wave component $f_p=(920\pm500)$ kHz of the video intermediate frequency signal applied to the multiplier circuit through the picture-carrier intermediate frequency extraction circuit 7 is produced at the output of the multiplier circuit 5. The magnitude of the beat is relatively high and it leaks to a chrominance signal circuit having a band approximately equal to 3.58±0.5 MHz to present visual disturbance. For example, in such a boundary portion that a television image changes steeply from a black level to a white level or from a white level to a black level, a colored flicker disturbance appears. This phenomenon is referred to as a so-called soundcross-color disturbance.

Figure 3:
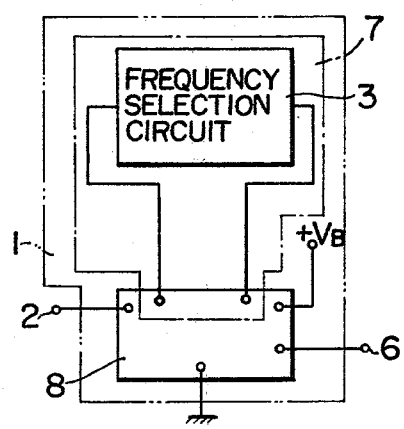
FIG. 3 shows a configuration of one embodiment of the present invention.
Figure 4A:
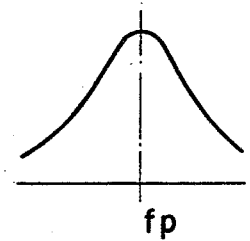
FIGS. 4a and 4b show frequency response characteristics of a picture-carrier intermediate frequency extraction circuit.
Figure 4B:
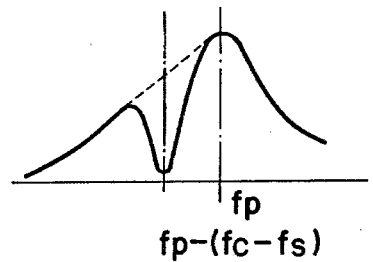

Now, one embodiment of the present invention is explained in detail. FIG. 3 shows a configuration of the embodiment of the present invention, in which numerals 1, 2, 3, 6, 7 and 8 denote the same parts as those of FIG. 2, but with the frequency selection circuit 3 further including a trap circuit of the present invention. The trap circuit is connected in parallel with the frequency selection circuit 3 which comprises the capacitor $C_o$ and the inductor $L_o$ in the conventional picture-carrier intermediate frequency extraction circuit 7 and which is tuned to the picture-carrier intermediate frequency ($f_p$). The trap circuit is designed such that it may be tuned to the frequency equal to the picture-carrier intermediate frequency ($f_p$) minus the color subcarrier intermediate frequency ($f_c$) minus the sound-carrier intermediate frequency ($f_s$) to form an LC series resonance circuit. In the existing NTSC standard system, the frequency ($f_c-f_s$) is equal to 920 kHz, and in the PAL system, the frequency ($f_c-f_s$) is equal to 1.07 MHz, 1.75 MHz or 2.07 MHz. A curve shown in FIG. 4a which shows a frequency selectivity characteristic of the picture-carrier intermediate frequency extraction circuit without the trap circuit is changed to a curve shown in FIG. 4b when the trap circuit is installed therein. Thus, the trap circuit can attenuate the side band wave component due to the video signal which is a cause of the sound-cross-color disturbance. A frequency characteristic for the video detected output is independent of the frequency selectivity characteristic shown in FIG. 4b and it is determined only by a frequency response characteristic of the video intermediate frequency amplifier circuit. Accordingly, the frequency response characteristic of the video detected output is not influenced by the insertion of the trap circuit in the picture-carrier intermediate frequency extraction circuit 7.

Figure 5D:
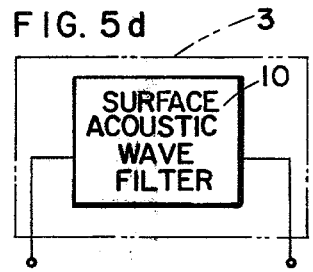
FIGS. 5a, 5b, 5c and 5d show four different selection circuits each having a different type of a trap circuit, which are applicable to the embodiment of the present invention.
Figure 5A:
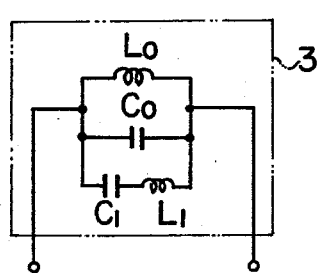
Figure 5B:
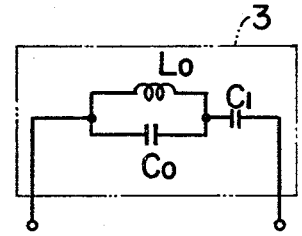
Figure 5C:
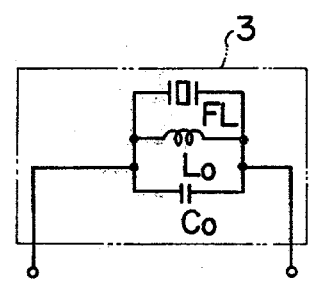

The trap circuit is installed into the frequency selection circuit 3 shown in the embodiment of FIG. 3. FIGS. 5a, 5b and 5c show three different frequency selection circuits each of which is provided with a different type of trap circuit. Those frequency selection circuits are all applicable to the embodiment of the present invention.

The frequency selection circuit 3 of FIG. 5a is provided with a trap circuit composed of a series circuit of an inductor $L_1$ and a capacitor $C_1$, and a trap circuit of the frequency selection circuit 3 of FIG. 5b is constituted by a series circuit of an inductor $L_o$ and a capacitor $C_1$. As shown in FIG. 5c, a piezoelectric element such as a ceramic resonator may be used as the trap circuit alternately the frequency selection circuit 3 and the trap circuit may be constructed by a surface acoustic wave filter 10, such as shown in FIG. 5d, which is tuned to have a resonance frequency as discussed above which can be set in the filter 10 in a manner known in the art. Further, when the picture-carrier intermediate frequency extraction circuit 7 is constructed by molded composite parts, it provides a simple component for a peripheral parts of an integrated circuit.

According to the present invention, since the frequency selection characteristic of the video carrier extraction circuit can fully attenuate the side band wave component produced by the video signal, the soundcross-color disturbance is materially reduced and the image problem is resolved. The frequency selectivity characteristic for an NTSC system television receiver becomes substantially equivalent to that when the sound trap circuit is inserted in the video intermediate frequency amplifier circuit preceding to the synchronous detection input terminal with respect to the soundcross-color disturbance. Accordingly, a sound trap circuit immediately before the video detector stage, which has been required in the prior art discrete circuit, can be eliminated and hence the phase characteristic of the chrominance signal as well as the luminance signal can be considerably improved.

At the same time, the video signal and the 4.5 MHz sound beat signal can be discriminated in common so that the circuit can be simplified.

We claim:

1. A video synchronous detector apparatus comprising:
   a first terminal for receiving a video intermediate frequency signal;
   a multiplier circuit having two inputs and an output, one of said two inputs being connected to said first terminal; and
   a picture-carrier intermediate frequency extraction circuit connected between said first terminal and the other of said two inputs;
   said picture-carrier intermediate frequency extraction circuit comprising a limiter circuit and a frequency selection circuit having a trap circuit, a resonance frequency of said trap circuit being equal to a differential frequency between a picture-carrier intermediate frequency and a differential frequency between a sound-carrier intermediate frequency and a color subcarrier intermediate frequency to reduce disturbances caused by a beat between the sound-carrier intermediate frequency and a side band component of the video intermediate frequency signal.

2. A video synchronous detector apparatus according to claim 1, wherein said frequency selection circuit comprises a parallel resonance circuit of a first inductor ($L_o$) and a first capacitor ($C_o$) and said trap circuit connected across said parallel resonance circuit, said trap circuit being composed of a series resonance circuit of a second inductor ($L_1$) and a second capacitor ($C_1$).

3. A video synchronous detector apparatus according to claim 1, wherein said frequency selection circuit comprises a parallel resonance circuit of an inductor ($L_o$) and a first capacitor ($C_1$) and said trap circuit, said trap circuit being composed of a series resonance circuit of said inductor ($L_o$) and a second capacitor ($C_1$).

4. A video synchronous detector apparatus according to claim 1, wherein said frequency selection circuit comprises a parallel resonance circuit of an inductor ($L_o$) and a capacitor ($C_o$) and said trap circuit connected across said parallel resonance circuit, said trap circuit being composed of a ceramic resonator (FL).

5. A video synchronous detector apparatus according to claim 1, wherein said frequency selection circuit is composed of a surface acoustic wave filter.

* * * * *